No. 695,773. Patented Mar. 18, 1902.
B. C. WHITE.
MOLDING MACHINE.
(Application filed June 29, 1901.)
(No Model.) 6 Sheets—Sheet 1.
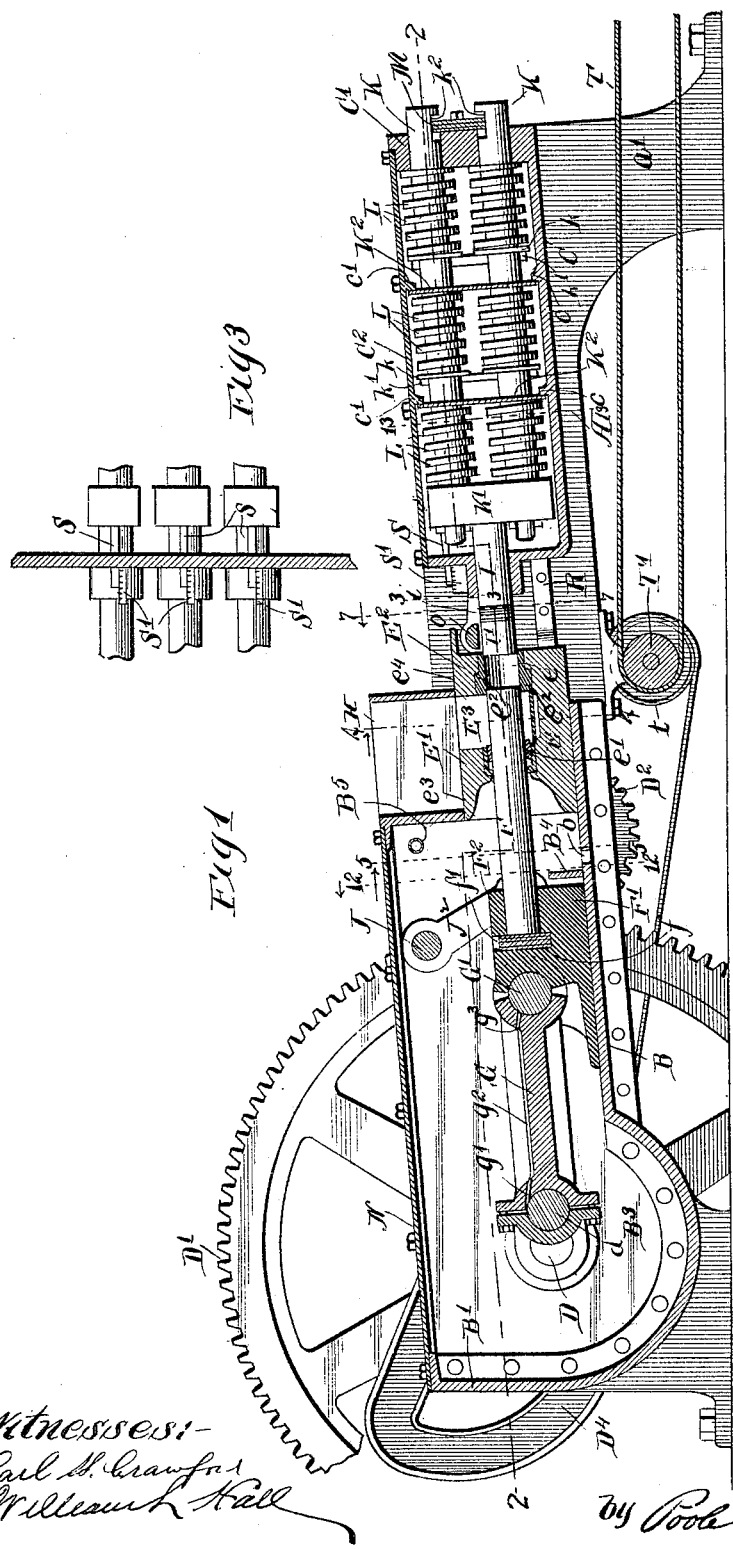
Witnesses:-
Carl M. Crawford
William L. Hall
Inventor:-
Bruce Clark White
by Poole & Brown
his Attorneys No. 695,773. Patented Mar. 18, 1902.
B. C. WHITE.
MOLDING MACHINE.
(Application filed June 29, 1901.)
(No Model.) 6 Sheets—Sheet 2.
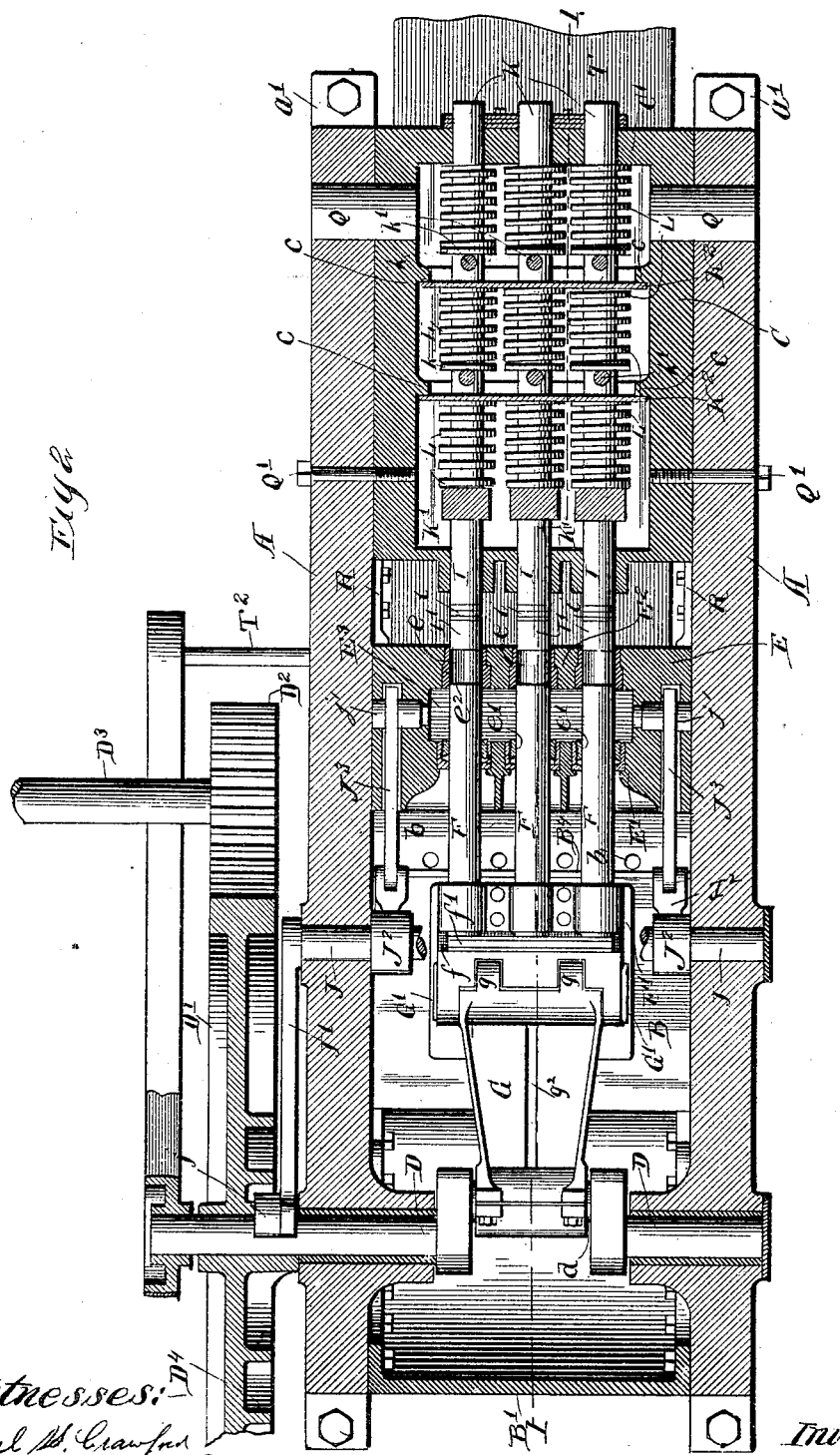
Witnesses:
Carl M. Crawford
William L. Hall
Inventor:
Bruce Clark White
by Poole & Brown
his Attorneys No. 695,773. Patented Mar. 18, 1902.
B. C. WHITE.
MOLDING MACHINE.
(Application filed June 29, 1901.)
(No Model.) 6 Sheets—Sheet 3.
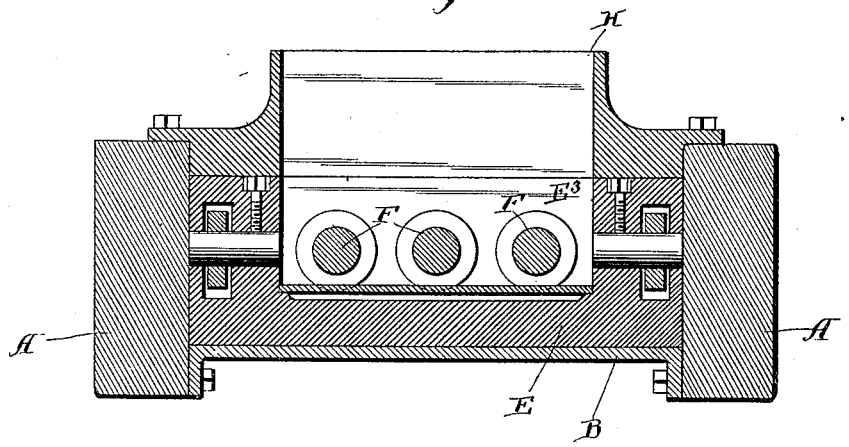
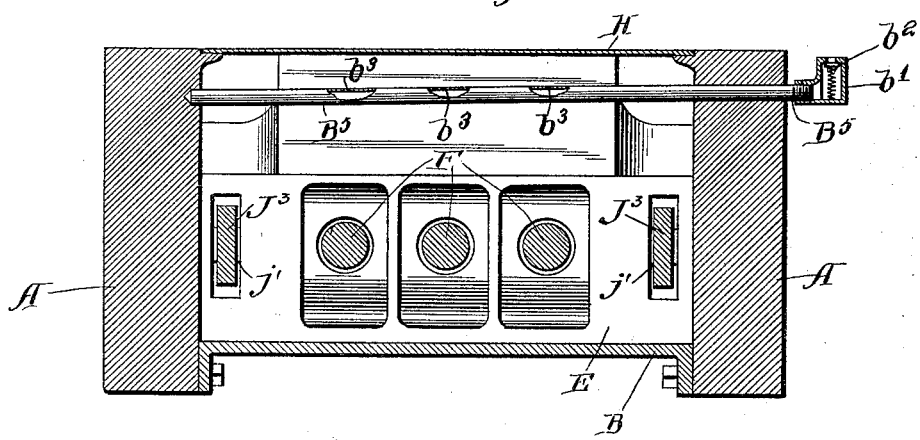
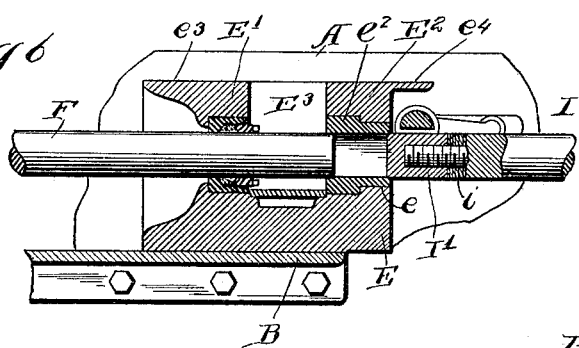
Witnesses:
Carl H. Crawford
William L. Hall
Inventor:
Bruce Clark White
by Poole Brown
his Attorneys No. 695,773. Patented Mar. 18, 1902.
B. C. WHITE.
MOLDING MACHINE.
(Application filed June 29, 1901.)
(No Model.) 6 Sheets—Sheet 4.
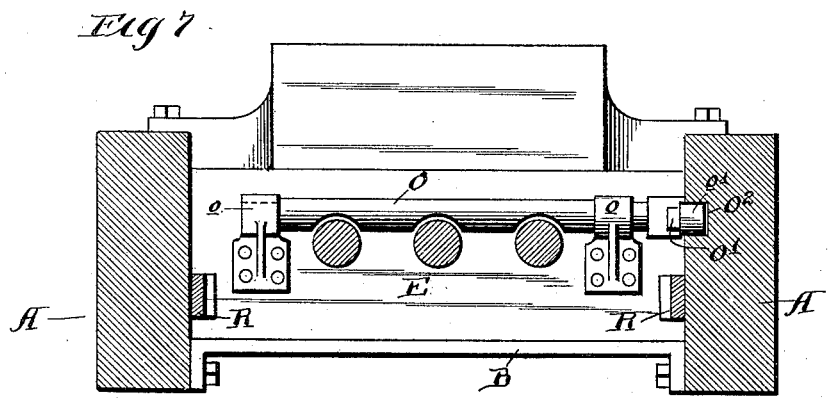
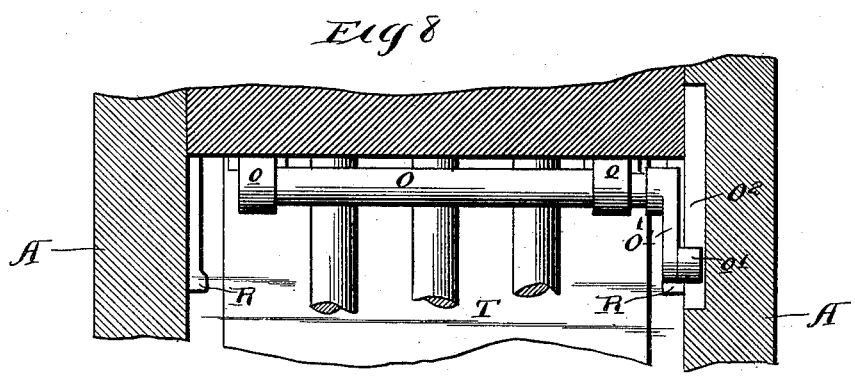
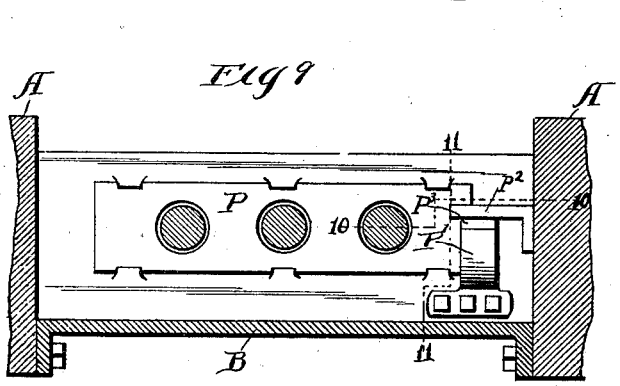
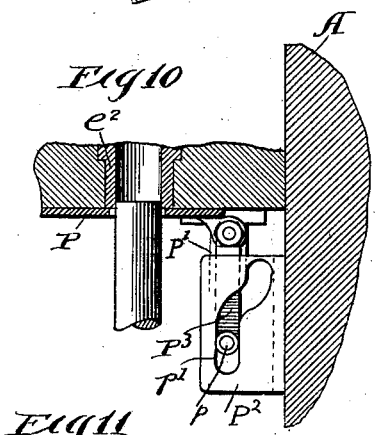
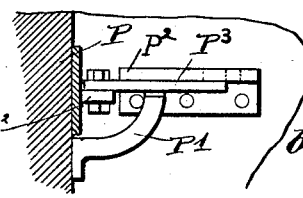
Witnesses:— Inventor:—
Carl H. Crawford Bruce Clark White
William L. Hall by Poole & Brown
His Attorneys No. 695,773. Patented Mar. 18, 1902.
B. C. WHITE.
MOLDING MACHINE.
(Application filed June 29, 1901.)
(No Model.) 6 Sheets—Sheet 5.
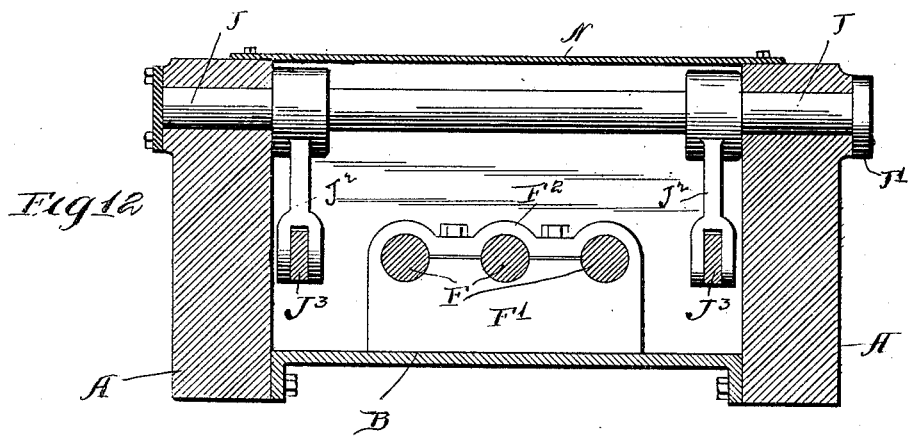
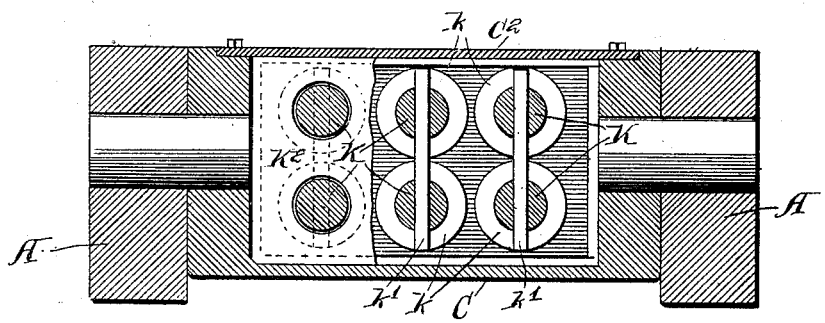
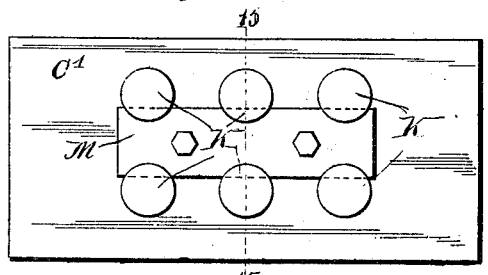
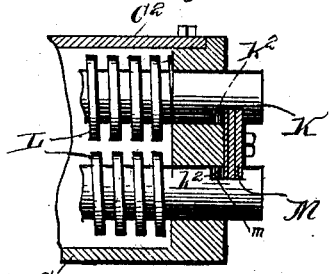
Witnesses:
Carl H. Crawford
William L. Hall
Inventor:
Bruce Clark White
by Pooler Brown
his Attorneys No. 695,773. Patented Mar. 18, 1902.
B. C. WHITE.
MOLDING MACHINE.
(Application filed June 29, 1901.)
(No Model.) 6 Sheets—Sheet 6.

Witnesses:
Carl W. Crawford
William L. Hall

Inventor:
Bruce Clark White
by Poole & Brown
his Attorneys

UNITED STATES PATENT OFFICE.

BRUCE CLARK WHITE, OF PITTSBURG, PENNSYLVANIA.

MOLDING-MACHINE.

SPECIFICATION forming part of Letters Patent No. 695,773, dated March 18, 1902.

Application filed June 29, 1901. Serial No. 66,463. (No model.)

*To all whom it may concern:*

Be it known that I, BRUCE CLARK WHITE, of Pittsburg, in the county of Allegheny and State of Pennsylvania, have invented certain new and useful Improvements in Molding-Machines; and I do hereby declare that the following is a full, clear, and exact description thereof, reference being had to the accompanying drawings, and to the letters of reference marked thereon, which form a part of this specification.

This invention relates to an improved construction in molding-machines for giving solid form to pulverulent semiplastic materials.
A machine embodying my invention may be employed for making briquets or solid blocks from granular or pulverulent fuel preparatory to burning the same, or from finely divided or pulverized ores or minerals preparatory to smelting, or for other similar uses.

Figure 16:
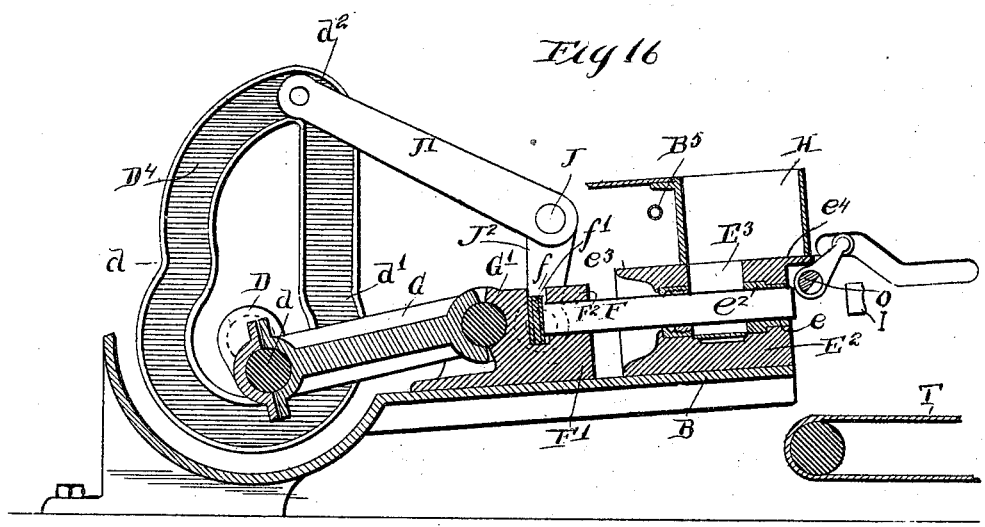
Figure 17:
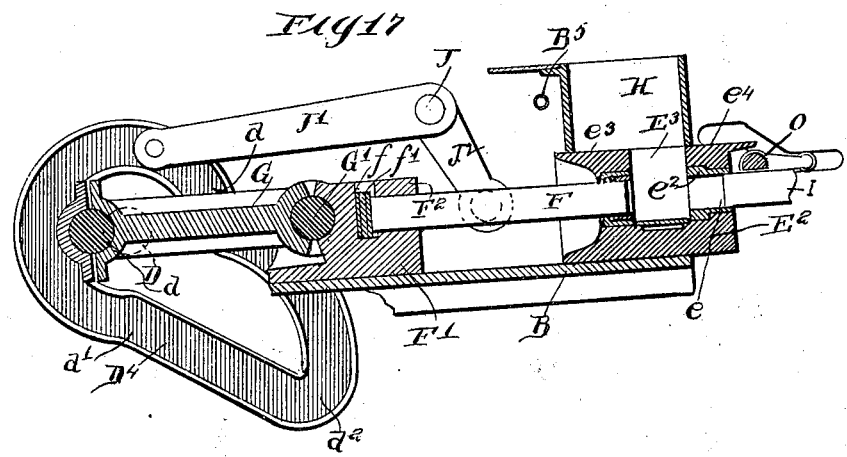

The invention consists in the matters hereinafter set forth and more particularly pointed out in the appended claims.
In the accompanying drawings, Figure 1 is a view in longitudinal vertical section taken on line 1 1 of Fig. 2, illustrating a machine embodying my invention. Fig. 2 is a plan section of the machine, taken on line 2 2 of Fig. 1. Fig. 3 is a detail plan view taken on the section-line 3 3 of Fig. 1. Fig. 4 is a cross-sectional view taken on line 4 4 of Fig. 1. Fig. 5 is a cross-sectional view taken on line 5 5 of Fig. 1. Fig. 6 is a longitudinal section taken through the mold-plate of the machine, showing a modified construction in the ends of the pistons which close the outer ends of the molds. Fig. 7 is a detail cross-section of the machine, illustrating the knock-off devices for dislodging the compressed material from the ends of the mold-plungers, said section being taken on line 7 7 of Fig. 1. Fig. 8 is a detail plan view of the parts shown in Fig. 7. Fig. 9 is a section similar to Fig. 7, illustrating a modified construction in the knock-off devices. Fig. 10 is a detail plan view taken on line 10 10 of Fig. 9. Fig. 11 is a sectional elevation taken on line 11 11 of Fig. 9. Fig. 12 is a detail cross-section taken on line 12 12 of Fig. 1. Fig. 13 is a similar cross-section taken on line 13 13 of Fig. 1. Fig. 14 is a detail end elevation of the end of the machine-frame at which the rods forming parts of the spring-buffer device project. Fig. 15 is a detail section taken on line 15 15 of Fig. 14, showing in detail the ends of said rods. Figs. 16 and 17 are diagrammatic views showing the main parts of the machine in central longitudinal section and illustrating different positions of the main parts of the operation of pressing.

As shown in said drawings, A A indicate two longitudinally-arranged parallel frame plates or castings, which are shown in the drawings as arranged in a slightly-inclined position with respect to the horizontal surface on which the machine rests and are provided at their ends with depending legs or standards $a'$ $a'$, by which the machine is supported from such horizontal surface.

B indicates a cast-metal bottom plate or web, which is inserted between and connects the side frame-plates A at the front or receiving end of the machine, and C is a cast-metal box or hollow casting located between and connecting the frames A A at the delivery or rear end of the machine. D is a crank-shaft which has bearings in said frame-plates A at the front end of the machine, D' a gear-wheel thereon, and $D^2$ a gear-pinion meshing with the gear-wheel and mounted on a counter-shaft $D^3$, through which driving power is transmitted to the machine.

E designates a mold-box, which rests and slides on the bottom plate B between the frame-plates A A, and F F F designate reciprocating plungers, which are attached to a cross-head F', which also rests and slides on the bottom plate B between the side frame-plates. Said cross-head is actuated by a pitman G, which is engaged with the crank-pin $d$ of the crank-shaft D and is connected with the cross-head by a pivot-pin G'. The end of the pitman G which engages the cross-head is shown as made nearly as wide as the cross-head and as provided with two laterally-separated annular parts $g$ $g$, which encircle the pivot-pin, while in its portions between and outside of the parts $g$ $g$ said pivot-pin rests in contact with concave bearing-surfaces on the widened end of the pitman and on the cross-head, Fig. 1, so that the thrust of the pitman is transmitted to the cross-head through the said pin, which by the construction described is interposed throughout nearly its entire length between the opposing bearing-surfaces on the pitman and cross-head. Said pitman is shown as having the form of a flat web, with stiffening ribs or flanges at its edges, and as provided at its outer end with a split bearing-box, the cap of which is secured to the pitman by bolts.

The mold-box E is of rectangular form and is provided with a transverse wall $E^2$, which constitutes, in effect, a mold-plate and is provided with apertures $e$, forming mold-recesses, and with a transverse wall $E'$, arranged parallel with the wall $E^2$, provided with guide-passages $e'$ for the plungers F, the wall $E'$ being located adjacent to the cross-head and serving to guide the said plungers, which pass through the guide-passages $e'$ and in the act of pressing enter the mold-recesses $e$ in the wall $E^2$. The space or chamber $E^3$, formed between the plates $E'$ and $E^2$, and the end and bottom walls of the mold-box constitute a receptacle for the material which is to be pressed, in which the said material is confined adjacent to the mold-recesses and from which portions or charges of such material are carried by the plungers into the mold-recesses in the reciprocatory motion of the plungers, the ends of said plungers being drawn backwardly into the chamber $E^3$ at each reciprocation of the plungers, so that portions of the material therein which fall in front of the plungers will be forced by the latter into the mold-recesses as the plungers advance toward and into the latter. Said wall $E'$ is provided with suitable stuffing-boxes surrounding said plungers and affording tight joints at these points. The mold-recesses $e$ are provided with hard-metal lining-sleeves $e^2$, as shown in Figs. 1, 2, 6, 10, 16, and 17, which serve to resist the wear caused by compressing the material therein.

H indicates a feed-box, which is located above the mold-box and is secured by bolts at its ends to the side frame-plates A, Fig. 4. The said feed-box fits at its lower edges against the top of the mold-box, which latter has extended flat top surfaces $e^3$ $e^4$, Figs. 1 and 5, at either side of the chamber $E^2$, which flat surfaces bear against the lower edges of the front and rear transverse walls of the feed-box, so as to always maintain tight joints between the edges of the feed-box and the top of the mold-box as the latter moves or is reciprocated beneath said feed-box.

I indicates endwise-movable pistons, which enter and serve to close the ends of the mold-recesses at the time of compression and which are disposed in alinement with the several mold-recesses and the plungers F F. Said pistons have separate sliding and yielding connection with the frame of the machine, as will hereinafter more fully appear. The entrance of the said pistons into and their exit from the ends of the mold-recesses is effected through the longitudinal movement of the mold-box.

Devices are provided for giving longitudinal reciprocatory motion to the mold-box E as follows: J designates a transverse rock-shaft arranged parallel with the crank-shaft and journaled in suitable bearings in the side plates A above the level of the plungers. The end of said shaft J adjacent to the gear-wheel $D'$ extends beyond the frame and is provided with a rigid arm or lever $J'$, which extends toward the said wheel and is engaged at its outer end with a cam-groove $D^4$, formed on the inner face of the gear-wheel $D'$, said arm being provided with a laterally-extending stud, having a bearing wheel or roller $j$ thereon adapted to travel in said cam-groove. $J^2$ $J^2$ designate rock-arms rigidly attached to said rock-shaft and located, preferably, inside of the frame-plates A and depending from said rock-shaft, as shown more clearly in Figs. 1, 2, and 12. Said rock-arms are connected with the mold-box by means of connecting-bars or pitmen $J^3$, pivoted to the lower or free ends of said rock-arms and engaged at their opposite ends with studs $j'$, secured in the ends of the mold-box, Figs. 2 and 5. It follows from this construction that when the shaft J is rocked through the medium of the arm $J'$ and cam-groove $D^4$ it will cause the mold-box and connected parts to reciprocate toward and from the ends of the pistons, which close the outer ends of the said mold-recesses. The configuration of the cam-groove and the relative movement of the cam and crank shaft and the parts operated by the same are shown more clearly in Figs. 16 and 17. Said cam-groove comprises a part concentric with the shaft D, which extends from $d$ to $d'$, an outwardly-deflected portion extending from $d'$ to $d^2$, and an irregularly-curved portion connecting the outer end of said outwardly-deflected portion with the concentric portion and extending from $d^2$ to $d$.

Referring now to the several positions assumed by the main parts above referred to in the operation of the machine, in Fig. 17 the mold-plate is shown at the limit of its outward movement with the pistons I I occupying the outer ends of the mold-recesses and the plungers F F withdrawn from the chamber of the mold-box, these being the positions of the parts at the beginning of the compression stroke of the plungers. In said Fig. 17 the bearing-roller $j$ on the lever $J'$ is shown as just entering the concentric portion of the cam-groove, and as the crank-shaft and connected cam-groove rotate toward the right it will, through its crank-pin and the pitman, move the plungers forward through the mass of pulverulent material within the mold-box and force portions of the same into the mold-recesses, wherein the same will be compressed between the plungers and the pistons, which then close the outer ends of said mold-recesses. During this time the roller on the actuating-arm $J'$ of the mold-plate is passing through the concentric portion of the cam-groove, and it is obvious that so long as said roller is engaged with such portion of the cam-groove no movement of the mold-box will occur. Said concentric portion of the groove is made of such length that the actuating-arm J' will be engaged therewith during the entire forward movement of the plungers.

In Fig. 1 the parts are shown in the positions which they occupy at the end of the compression stroke of the plunger. From this figure it will be seen that the bearing-roller of the actuating-arm J' is just about to pass from the concentric to the outwardly-deflected portion of the cam-groove. The concentric part of the cam-groove is connected with the outwardly-deflected part thereof by a short portion of intermediate inclination or obliquity, and as the roller on the arm J' passes through such short portion the mold-box is moved backward a short distance with or at the same rate of speed as the plungers, which at this time also begin their backward movement through the action of the crank-shaft and pitman, the crank-pin, as shown in said Fig. 1, being arranged to begin its downward and backward movement when the roller of the arm J' leaves the concentric part of the cam-groove. The object of providing for a short simultaneous movement of the mold-box and plungers together or at the same speed will be hereinafter explained. Further movement of the cam after the roller enters the straight outwardly-deflected part of the groove causes the end of the actuating-arm to be quickly raised by reason of its passage through such outwardly-deflection portion of the cam-groove, and said arm acts, through the rock-shaft and its connection with the mold-box, to quickly move the latter rearwardly, and by reason of the abrupt rise of the cam-groove the rearward movement of the mold-box will be much faster than the retractive movement of the plungers, which begins practically at the same time, so that said plungers will be separated from the ends of the pistons and also caused to project through the outer ends of said mold-recesses, and thus force the molded blocks from and clear of said mold-recesses. This last-mentioned position is shown in Fig. 16, in which the bearing-roller of the actuating-arm J' is just passing from the outwardly-deflected portion of the cam-groove into the irregularly-curved portion connecting the same with the concentric portion, at which time the mold-box has reached the rearward limit of its movement. At such time the plungers will not have been fully retracted; but through the continuous rotation of the shaft the plungers will be drawn back to their rearward limit of movement, and at the same time the mold-plate will be caused to move outwardly until the parts again reach the position shown in Fig. 17.

As a further and separate improvement the pistons I I, which close the outer ends of the mold, are supported on the machine-frame in such manner as to yield in the direction of their length under the pressure of the plungers on the material in the mold. The parts constituting this feature of my invention, as shown in the drawings, are made as follows: The casting C at the rear or discharge end of the machine is made of hollow or box-like form having, as shown in the drawings, integral bottom, end, and side walls and a separate removable top wall or plate $C^2$, secured thereto by bolts. In the said casting C are mounted a plurality of longitudinally-arranged supporting-rods K K, arranged in pairs, with the rods forming each pair located one above the other, the rods forming each pair being connected at their forward ends by means of an upright cross-head K', formed on or secured to one of the pistons I. The rods K rest at their rear or outer ends in guide-apertures in the rear cross-piece or end wall C' of the casting C, in which guide-apertures they are adapted to freely slide. To each of the rods is applied one or more springs, herein shown as having the form of spiral expansion-springs L, arranged to surround the rods. Said springs are interposed between bearing-shoulders on the rods and bearing-plates $K^2$, Figs. 2 and 13, which are rigidly supported in the casting C. The bearing-shoulders on the rods, as herein shown, are in the case of the springs at the forward ends of the rods formed by the cross-heads K' and in the case of the remaining springs by means of apertured plates or rings $k$, which are slipped over the rods and held thereon from movement toward the inner ends of the rods by means of pins $k'$, which pass through the rods and overlap the plates on either side thereof, each pin, as shown in the drawings, passing through the two coupled rods forming each pair. The bearing-plates $K^2$, against which said springs act, are of oblong form and provided with a number of apertures equal in number to the rods and through which said rods pass. Said bearing-plates are held rigidly in place and from rearward movement in the casting by means of suitable stops or shoulders on the casting C. (Shown in the drawings as formed by vertical inwardly-extending ribs $c$ on the side and bottom walls of the casting and by similar ribs $c'$ on the under surface of the cover-plate $C^2$.) In the drawings each rod is shown as provided with three springs, and two bearing-plates $K^2$ $K^2$ are employed, the springs at the rear ends of the rods being arranged to bear against the rear cross-piece or wall C' of the casting C.

The purpose of providing separate yielding backing-springs for each piston, as described, is to enable the blocks of material compressed at one time in the several molds to be given the required degree of pressure, so that the material in all of the molds will be suitably compressed, notwithstanding the fact that one mold may contain a slightly-greater amount of material than others, it being obvious that in the mold containing the greater amount of material the yielding piston closing its outer end will, when pressure is brought thereon, yield backwardly, and thus permit the material in the other mold to receive the proper amount of pressure, notwithstanding the fact that the several plungers are rigidly connected with each other and with the crank which actuates them. One important advantage gained by the employment of springs arranged as described is that a large number of springs may be provided in a small space, it being obvious that in the general construction of the parts described a large number of springs may be arranged to act on each piston without making the machine unduly large to accommodate such springs.

To provide means for increasing or decreasing the tension of the several springs which act upon the rods K, said rods are shown as provided at their inner ends, which project through the rear wall C' of the casting C, with notches $k^2$, which on the upper and lower rows of rods face each other, and attached to the said rear wall between the said projecting ends of the rod is a rectangular plate M, the margins of which enter the notches of all of the rods and by engagement with the end surfaces or shoulders at the ends of said notches determine the position of the said rods and of the plungers connected therewith when thrown forward or toward the mold-box by the action of said springs. Between the plates M and the casting C are inserted one or more plates or shims $m$, which by holding the plate M at a greater or less distance from the casting C permit greater or less endwise movement of the rods K under the action of the said springs, and thereby hold said springs under greater or less tension, according to the number of plates $m$ inserted beneath the plate M or the thickness of the said plate or plates. The adjustment of the tension of the springs L in the manner described obviously provides for giving a greater or less spring-pressure upon the plungers I at the time of compression, it being manifest that if the springs are held under considerable tension at the beginning of the act of compression the pressure exerted by said springs will be much greater at the time of extreme compression or at the extreme forwardly limit of the movement of the plungers F than would be the case if the springs L were under little or no compression when the pistons are at the forward or outward limit of their movement. Provision is also made for adjusting the length of each piston I or, in other words, the distance from the forward or working end of the said piston to the cross-head K', to which it is attached. Such adjustment of the length of the piston is obtained by providing said piston with a separate cap or head I', which enters the mold-recess and forms the working face or end of the piston in connection with means for adjusting the said cap or head I' with respect to the portion of the said piston which is attached to the said cross-head. I have shown in the accompanying drawings means for effecting this adjustment consisting of a series of rings, annular plates, or washers $i$, placed between the abutting ends of said head I' and the main part of the piston and held in place by screw-threaded shanks $i'$, forming an extension of the main part of the piston and entering a screw-threaded recess in the cap I'.

By the adjustment provided between the cap or head I' and the body of the piston two results are attained. If it be desired to vary or change the capacity of the mold, so as to make a larger or smaller compressed block or briquet, the cap I' may be adjusted with respect to the body of the piston by adding or removing one or more of the washers $i$. This adjustment of the said cap will result in a larger or smaller quantity of material being inserted in the mold-recess by the action of the plunger and a correspondingly larger or smaller block or briquet being produced, the pressure exerted on the block or briquet under maximum compression manifestly remaining unchanged if the tension of the springs be not changed. If, however, it be desired to change the tension of the springs, so as to make the pressure on the material in the mold-recess greater or less at the time of greatest compression and the position of the rod K be changed for this purpose by inserting or removing one or more of the plates or shims $m$, as hereinbefore described, the change in the position of the rods K at the forward limit of their movement arising from such adjustment of the tension of the springs will also change the position of the forward or working end of the cap I' at the time of filling the mold as well as at the time of greatest compression. In order, therefore, to compensate for this change in the position of the piston through adjustment of the tension of the springs, it becomes necessary to insert or remove one or more of the washers $i$, and thereby change the length of the pistons I to a degree or extent corresponding to the endwise adjustment of the rods K. It follows from the above that by the employment of the adjusting means described or other means for adjusting the length of the pistons I provision is made for an increase or decrease of the size of the block or briquet formed by compression in the mold-recess, and provision is also made for maintaining unchanged the capacity of the mold and the size of the finished block or briquet when the tension of the springs is changed to give greater or less pressure at the time of maximum compression. Moreover, the adjusting means provided for changing the length of the piston I affords a means for adjustment or compensation in case of wear of the parts or in case it shall become necessary or desirable to refinish or resurface the ends of the heads or caps of the pistons in case they become imperfect or rounded at their edges by wear.

The bottom plate B, which, as before stated, extends between the side plates A and forms a support or bearing for the mold-box E and the cross-head F', is provided with an upwardly and rearwardly curved portion B', which rises upwardly to the level of the side margins of the side plates A, and a top plate or cover N is secured to the upper edges of the side plates, to the upper margin of the curved part B' of the plate B, and to the rear edge of the feed-box H, thereby forming a dust-tight housing or inclosure which surrounds the crank-shaft, cross-head, plungers, rock-shaft, and other operative parts. As the mold-box slides or fits closely between the bottom of the feed-box H and bottom plate B and bears at its ends against the sides of the frame-plates A A, access of dust or dirt into the inclosure formed as described is entirely prevented. Said inclosure is adapted to receive a liquid lubricant within which the crank-shaft is submerged during a portion of its rotation, the bottom plate B in its part beneath the crank-shaft being depressed below the level of the part thereof on which the cross-head slides to form a receptacle $B^3$ for the lubricant into or through which the crank-pin and the head of the connecting-rod moves at each rotation of the shaft. The purpose of inclining the entire machine-frame, as hereinbefore mentioned, is to give an inclined position to the bottom plate B downwardly from its front to its rear end, so that when said inclosure is filled with the lubricant to or somewhat above the level of the lower end of said bottom plate the cross-head will enter the lubricant at each reciprocation thereof, and lubricant fed to the cross-head bearings and to the bearings of the rock-shaft and its connected parts will flow by gravity to the said receptacle $B^3$.

To provide means for lubricating the pivot-pin G', which joins the pitman with the cross-head, a hole $g'$ is bored in the outer end of the pitman in such manner as to extend from the surface thereof which engages the crank-pin $d$ downwardly to the top surface of the central or web portion of the pitman, which latter is provided with a small groove or channel $g^2$, extending longitudinally thereof to the inner end of the same. A hole $g^3$ extends from the end of said groove or channel $g^2$ to the bearing-face between the pitman and the pivot-pin G'. It follows from this construction that the crank-pin bearing is kept lubricated by its frequent immersion in the lubricant in the receptacle $B^3$ and that lubricant from said crank-pin bearing passes outwardly through the hole $g'$ to the channel $g^2$, so that when the pitman is downwardly inclined or at the time the crank-pin is in its elevated position the lubricant will flow along the said channel and thence through the hole $g^3$. It follows that the lubricant will be continuously conveyed or carried to the bearing-surface of the said pivot-pin connecting the pitman with the cross-head. Manifestly surplus lubricant from the pivot-pin bearings will flow downwardly to the bearing-surface of the bottom plate B and will finally reach the receptacle $B^3$.

Attached to and rising from the bottom plate B is a transverse wall or partition $B^4$, extending into contact with the side plates A A and located between the cross-head and mold-box, closely adjacent to the cross-head when the latter is at the inward limit of its stroke. In connection with said partition holes $b$ are made in the bottom plate between said partition and the mold-box. It is found in the operation of a machine like that shown that more or less dust and grit may find its way between the top of the mold-box and the hopper and around the plungers into the inclosure in which the cross-head slides, this being especially liable to occur after the parts have become worn by use. The partition arranged as described serves to confine such dust or grit, so as to prevent it from reaching the bearing-surface of the bottom plate on which the cross-head slides, while the holes $b$ permit the admixture of lubricant with such dust and dirt accumulating behind the partition to escape or pass out of the inclosure.

To provide means for lubricating the plungers F F and the top surface of the mold-box, I have provided a pipe $B^5$, which extends horizontally across the inclosure below the top plate N and adjacent to the feed-box. Said pipe extends at one end through a hole in one of the frame-plates A and has bearing at its opposite end in a recess in the inner face of the opposite frame-plate. At its end which extends outside of the frame the said pipe is provided with a bent end or elbow $b'$, having an oil-receiving aperture provided with an inwardly-opening spring-actuated check-valve $b^2$. The said pipe is closed at its inner end and is provided with a series of perforations $b^3 b^3$ at its side at which the elbow $b'$ projects. The said pipe is adapted to turn or rotate in its bearings in the frame-plates. When its elbow is turned upwardly, the apertures in the pipe will be at the top surface of the same, and the latter may be filled with oil through the inlet-valve, and such oil will be discharged through the apertures in the pipe by reversing the same or turning the pipe until the apertures therein are directed downwardly. Such apertures will be spaced so that one or more of them will come over each of the plungers F. If it be desired to lubricate the plungers, the crank-shaft will be turned until the said plungers are withdrawn from the mold-box, as seen in Fig. 17, and the filled lubricating-pipe will be turned to permit the oil therein to flow from its apertures upon the said plungers. Similarly if it be desired to lubricate the top surface of the mold-box the pipe will be reversed when the top surface of the mold-box is beneath it, as shown in Fig. 16.

To provide means for adjusting the position of the several plungers longitudinally with respect to the cross-head, said plungers are connected with the cross-head as follows: Said cross-head is provided with a deep notch or groove $f$, extending across the same and reaching below the level of the plungers, and with a series of cylindric openings to receive the ends of said plungers, which openings intersect said groove. Within said groove, behind the ends of the plungers, are placed a number of thin plates or shims $f'$, against which the inner ends of the plungers bear. The plungers may be clamped in the recesses in the cross-head by means of a cap piece or plate $F^3$ and bolts inserted therethrough into the body of the cross-head. Said cap-piece may, as shown, be joined integrally with the body of said cross-head at its ends. Manifestly when it is desired to adjust the plungers the cap-plate will be loosened to release the plungers, and one or more shims or plates $f'$ will be removed or inserted, after which the plungers will be forced backwardly into contact with the shims and the cap-plates then tightened to rigidly secure the plungers to the cross-head. Manifestly endwise adjustment of the plungers in the cross-head may be required to compensate for wear in the parts of the machine. Such adjustment also enables the degree of compression applied to the material in the molds to be increased or diminished without disturbing the pistons I I, and the plungers may sometimes be desirably so adjusted for this purpose.

To provide means for removing from the ends of the plungers the briquets formed by compression in the molds, the same being liable to stick to the said ends of the said plungers after the same have been forced out of the molds, a device is provided as follows: O, Figs. 7 and 8, is a rock-shaft mounted on the face of the mold-box, adjacent to and above the mold-apertures therein, the same being herein shown as mounted at its ends in bracket-bearings $o$ $o$, attached to the mold-box. Said rock-shaft is cut away on its lower surface adjacent to the mold-recesses to about half its diameter and so arranged that it will when in one position not interfere at all with the movement of the plungers or pistons, but when said rock-shaft is turned or rotated one of its side edges will be thrown into the path of the plungers, and thereby be brought into position to strike and dislodge any briquets which may adhere to the ends of the plungers. Provision is made for giving rocking motion to the shaft O at proper times in the operation of the machine, the same, as herein shown, consisting of a rock-arm O' on the shaft O, which rock-arm is provided with a pin $o'$, adapted to engage and slide in a longitudinal cam-groove $O^2$, formed in the inner face of one of the side plates A, said cam-groove being so shaped, Figs. 16 and 17, that it will rock the shaft so as to bring one of its edges downwardly into contact with the briquet at the time the mold-box reaches the rearward limit of its movement and the finished briquet is ejected. Another device for the same purpose is shown in Figs. 9, 10, and 11. In this instance a laterally-sliding plate P is mounted on the face of a mold-box, said plate being provided with holes corresponding in position with the mold-recesses, and devices are provided for giving motion to said plate, consisting of a lever $P^3$, pivoted on a bracket $P'$, attached to the mold-box and provided at its end remote from the plate with a stud $p$, adapted to engage a cam-groove $p'$, formed in a horizontal plate $P^2$, attached to the inner face of the side frame-plate A, the said lever being pivoted at its inner end to a lug $p^2$ on the end of the said plate P. A sliding connection is provided between the end of the lever and the lug $p^2$ to allow for the curved path of the end of the lever.

So far as the operation of the main parts of the machine is concerned the casting C, in which the rods K are mounted, may be secured to the side plates A A by any suitable attaching means, affording a strong and rigid connection between the parts. I have, however, shown in the accompanying drawings a special form of connection, consisting of two heavy cylindric pins or trunnions Q Q, inserted through the side plates and through the side walls of the casting C, adjacent to the rear or outer end of said casting, said pins or trunnions being of a size or strength necessary to withstand the great strain brought thereon by the action of the crank-shaft B in the act of compressing the material in the molds. In connection with said pins or trunnions are also provided two bolts $Q'$ $Q'$, which are inserted through holes in the said side plates A and into the side walls of the casting C, near the inner or forward end of the same. The holes in the side plates A, through which the bolts $Q'$ pass, are enlarged vertically to permit a slight vertical adjustment on the inner end of the casting C. The purpose of providing such slight vertical adjustment of the inner end of the casting C is to compensate for wear of the bearing-surfaces between the mold-box and the bottom plate B, on which it rests, it being obvious that such wear will finally result in the mold-recesses being slightly depressed and that by providing for a slight vertical adjustment of the inner end of the casting C the ends of the pistons in cases where such wear occurs may be adjusted into exact vertical alinement with the mold-recesses. The bolts $Q'$ $Q'$ manifestly also serve to clamp or hold the side frames rigidly to the casting C.

By removing the bolts $Q'$ $Q'$ the inner end of the casting C may be allowed to swing downwardly on or about the pins or trunnions Q, thereby bringing the pistons below and clear of the mold-box, affording access to the mold-box and permitting removal of the mold-box and also of the plungers without disturbing other parts of the machine.

To provide a positive stop for limiting the movement of the mold-box at the extreme forward limit of its throw, stop-plates R R are bolted to the inner faces of the side plates A in position for contact of the front face of the feed-box therewith, said stop-plates being preferably made long enough to reach to the inner face of the casting C, so as to bear against the same, and thereby relieve the strain upon the bolts securing them to the side plates. It being understood that the several plungers advance and compression takes place when the mold-box is at the forward or inward limit of its movement, it will be manifest that if any such stops for the mold-box were omitted the frictional engagement of the material in the molds with the walls thereof would tend to produce movement of the mold-box with the plungers, and thereby produce very heavy strains upon the devices by which the mold-box is actuated, including the lever-arm J' and the cam operating the same, and such strains would manifestly tend to produce unequal wear in and looseness of the said operative parts. By the employment of the stationary plates R R or other suitably-arranged stop projections on the frame the mold-box is positively held from advance movement during the forward motion or compressing stroke of the plungers and the bringing of objectionable strain on the mold-box-actuating devices thereby avoided.

It has been hereinbefore stated that the cam-groove through which the mold-box is actuated is so arranged that in the beginning of its retractive movement after the material in the molds has been compressed said cam-groove is so shaped as to move the mold-box backwardly a short distance with or at the same rate of speed as the plungers. The purpose of this construction in the cam-groove will be understood by consideration of the fact that when the plungers begin their rearward movement the backing-springs of the piston being at such time under compression will act to throw the pistons forward, so that the latter will follow the plungers for a short distance backwardly from their most advanced position. It follows that the blocks or briquets within the mold-recesses will still be subject to the endwise pressure of the pistons, due to the action of the springs, until the pistons have advanced so far as permitted by the stop-plate M at the rear ends of the rods K, and if the mold-box was retracted without also retracting the plungers the several blocks or briquets would be carried partially out of the mold-recesses while still held in compression between the ends of the plungers and the ends of the pistons, the same then being subject to the full pressure due to the action of the springs on the pistons. This would manifestly be objectionable, inasmuch as the pressure might be sufficient to crush the said blocks or briquets when no longer entirely confined within the mold-recesses. By moving the mold-box with the plungers, as described, until the pistons have moved forward so far as permitted by the stop-plate M the blocks or briquets will be entirely relieved of the pressure of the springs before the mold-box is moved with respect to the plungers in a manner to move the blocks or briquets in or force them partially from the mold-recesses.

In Figs. 1 and 3 are shown indicating devices adapted to show to the person operating the machine the conditions under which the machine is acting with respect to the amount of pressure applied to the material within the mold-recesses. Such indicating devices, as shown in said Figs. 1 and 3, consist of slide-rods S, secured to the cross-heads K', belonging to the several pistons I and passing through the inner end wall of the casting C parallel with said pistons, and stationary scale-plates S', attached to said wall of the casting C and so arranged that marks or pointers on said rods S will move along said scale-plates, the movement of said rods S obviously corresponding to the backward-and-forward movements of the pistons as the springs are compressed under the pressure of the plungers on the material within the mold-recesses. The scale-plates S' are marked to indicate the amount of pressure upon the pistons in total tons or otherwise, so that the several indicating devices will separately indicate the pressure coming upon the several pistons, it being obvious that a given amount of pressure will always compress the backing-springs to the same extent, so that the endwise movement of the pistons will always accurately indicate the amount of pressure coming thereon. Moreover, the indicating devices, arranged as described, will always show to the operator not only the maximum pressure exerted by the pistons, but also the initial pressure in cases where the springs are held normally under compression by adjustment of the plate M for that purpose. The indicating devices, arranged as described, are of especial importance in the machine illustrated, wherein the piston, cross-head, backing-springs, and their supporting-rods are located within and are concealed by the casting C and its cover, it being obvious that the person operating the machine by observing the several indicating devices can be informed at all times as to the degree of pressure in the several mold-recesses and whether the material is being fed to the several mold-recesses in quantities required to produce the required degree of compression, and is thereby enabled by regulation of the feed or otherwise to secure the desired uniform results in the pressing, notwithstanding variations in the character of the material being operated upon or other varying conditions of operation.

The finished blocks or briquets ejected from the mold-recesses in the manner described may be disposed of in any suitable manner, the device for this purpose herein shown consisting of a traveling belt T, located beneath the machine and supported by means of a roller T', said roller being mounted on a shaft $T^2$ and being given movement to drive the belt by means of a driving-pulley $t$ on the said shaft, which may be driven from a separate source of power or from a rotative part of the machine itself.

I claim as my invention—

1. A molding-machine comprising a machine-frame, a mold-plate having reciprocatory motion on the machine-frame and which is provided with a mold-recess, an inclosure confining the material to be molded adjacent to the mold-plate, a reciprocating plunger adapted to enter said mold-recess, and a piston for closing the outer end of the mold-recess, said piston being mounted on the machine-frame and being yieldingly held thereon in operative position by a backing spring or springs.

2. A molding-machine comprising a machine-frame, a mold-plate provided with a plurality of mold-recesses, an inclosure confining the material to be molded adjacent to the mold-plate, a plurality of reciprocating plungers arranged to enter the mold-recesses, and a plurality of pistons for closing the outer ends of the several mold-recesses, said pistons being mounted on the machine-frame and having separate yielding connection with said frame.

3. A molding-machine comprising a machine-frame, a mold-plate provided with mold-recesses, a plurality of plungers arranged to enter said mold-recesses, pistons for closing the outer ends of said mold-recesses, a plurality of rods for supporting the several pistons, said rods having endwise-sliding movement on the machine-frame, and a spring or springs applied between a shoulder or shoulders on each rod, and an opposing bearing surface or surfaces on the machine-frame whereby each piston is yieldingly held in operative position and is adapted to yield independently of the other pistons under the pressure of its opposing plunger.

4. The combination with a machine-frame, of a reciprocatory mold-plate provided with mold-recesses, an inclosure confining the material to be molded adjacent to said mold-plate, a plurality of reciprocating plungers adapted to enter the said mold-recesses, a plurality of pistons for closing the outer ends of said mold-recesses, said pistons having separate endwise-movable connections with the machine-frame, and backing-springs applied between said pistons and the machine-frame.

5. A molding-machine comprising a reciprocating mold-plate provided with mold-recesses, an inclosure confining the material to be molded adjacent to said mold-plate, a reciprocating plunger adapted to enter said mold-recesses, a piston for closing the outer ends of said mold-recesses, backing-springs applied between said pistons and the machine-frame, and means for adjusting the tension of said backing-springs.

6. A molding-machine comprising a reciprocating mold-plate, provided with a mold-recess, an inclosure confining the material to be molded adjacent to said mold-plate, a piston for closing the outer end of said mold-recess, a rod mounted to slide in the machine-frame to which the said piston is attached, a spring or springs interposed between a shoulder or shoulders on said rod and said frame for holding said piston in operative position, and means for adjustably controlling the position in which said rod is held by the action of said spring or springs, whereby the tension of said spring or springs at the time of compression may be varied.

7. A molding-machine comprising a reciprocating mold-plate provided with a mold-recess, an inclosure confining the material to be molded adjacent to said mold-plate, a reciprocating plunger adapted to enter said mold-recess, a piston for closing the outer end of said mold-recess, an endwise-movable rod for supporting said piston, a spring or springs applied to said rod to hold the piston in its advanced position, means for varying the tension of said spring or springs, and means for varying the position of the working face of said piston with respect to the said rod.

8. A molding-machine comprising a reciprocating mold-plate provided with a mold-recess, an inclosure confining the material to be molded adjacent to the said mold-plate, a reciprocating plunger adapted to enter said mold-recess, a piston for closing the outer end of said mold-recess, a rod mounted to slide in said machine-frame and adapted to support said piston, a spring or springs applied to said rod, means for adjustably limiting the movement of the said rod under the action of said spring or springs, and means for adjusting the position longitudinally of the working face of the piston with respect to the said rod.

9. A molding-machine comprising a reciprocating mold-plate provided with a mold-recess, an inclosure confining the material to be molded adjacent to the mold-plate, a reciprocating plunger adapted to enter said mold-recess, a piston for closing the outer end of said mold-recess, a rod mounted to slide endwise on the machine-frame for supporting said piston, a backing spring or springs applied between said rod and the machine-frame, an adjustable stop on the machine-frame adapted to engage said rod for varying the tension of said spring or springs, and means for varying the position of the working face of the piston with respect to said rod.

10. A molding-machine comprising a reciprocating mold-plate, provided with a mold-recess, a plunger adapted to enter said mold-recess, a piston for closing the outer end of said mold-recess, a rod on which said piston is supported, said rod being mounted to slide endwise on the machine-frame, and being provided with a plurality of bearing-shoulders, and a plurality of springs interposed between said shoulders on the rod and opposing bearing-surfaces on the machine-frame, an adjustable stop on the machine-frame for limiting the forward movement of said rod under the action of said spring or springs, and means for adjusting the position of the working face of the piston with respect to the said rod.

11. A molding-machine comprising a reciprocating mold-plate provided with mold-recess, an inclosure confining the material to be molded adjacent to said mold-plate, a reciprocating plunger adapted to enter said mold-recess, a piston for closing the outer end of said mold-recess, a plurality of rods mounted in the machine-frame, and connected by a cross-head with said piston, and backing-springs applied between shoulders on the several rods and opposing bearing-surfaces on the machine-frame.

12. A molding-machine comprising a mold-plate provided with a mold-recess, an inclosure confining the material to be molded adjacent to said mold-plate, a plunger adapted to enter said mold-recess, a piston for closing the outer end of said mold-recess, said piston having endwise-movable connection with the machine-frame, and a backing spring or springs for said piston, said piston consisting of two relatively adjustable parts and being provided with spacing plates or washers between said parts.

13. A molding-machine comprising a mold-plate provided with mold-recesses, an inclosure confining the material to be molded adjacent to said mold-plate, a plurality of reciprocating plungers adapted to enter said mold-recesses, pistons for closing the outer ends of said mold-recesses, two rods connected with each of said rods by a cross-head, said rods being mounted to slide endwise on the machine-frame, backing-springs interposed between shoulders on the said rods, and opposing shoulders on the machine-frame, a stop-plate attached to the machine-frame between said rods and engaging shoulders on the several rods for limiting their movement under the action of the backing-springs, and spacing plates or shims inserted between said stop-plate and the part of the machine-frame to which it is attached, for adjusting the position of the said stop-plate.

14. A molding-machine comprising a machine-frame, a mold-plate provided with a mold-recess, an inclosure confining the material to be molded adjacent to said mold-plate, a reciprocating plunger adapted to enter the said mold-recess, a piston for closing the outer end of the mold-recess, a rod on which said piston is supported, a hollow casting in which said rod is mounted, said casting being pivotally and adjustably connected with the machine-frame, and a plurality of springs interposed between a shoulder or shoulders on said rod and an opposing surface in said hollow casting.

15. A molding-machine comprising a machine-frame, a mold-plate provided with an inclosure confining the material to be molded adjacent to said mold-plate, a reciprocating plunger adapted to enter said mold-recess, a piston for closing the outer end of said mold-recess, a rod on which said piston is supported, a hollow casting attached to the machine-frame with which said rod has endwise sliding engagement, one or more transverse bearing-plates mounted in the said casting and provided with apertures for the passage of said rod, and coiled backing-springs surrounding the rod, said springs being interposed between shoulders on said rod, the rear end of said casting and said bearing plate or plates.

16. The combination with a machine-frame, of a mold-plate provided with mold-recesses, reciprocating plungers, pistons for closing the outer ends of said mold-recesses, rods supporting said pistons, a hollow casting attached to the machine-frame in which said rods are mounted to slide, said hollow casting having a removable wall and being provided with a rear end wall having apertures for said rods, and with inwardly-projecting ribs forming interior bearing surfaces or shoulders on its top, bottom and side walls, a bearing plate or plates inserted within said casting and bearing against said interior shoulders, bearing-shoulders on the said rods, and coiled springs surrounding the rods and abutting against said end wall and bearing plate or plates and the shoulders on the rods.

17. The combination with a machine-frame, of a mold-plate provided with mold-recesses, reciprocating plungers, pistons for closing the outer ends of the mold-recesses, two rods, located one above the other, and connected with each piston by a cross-head, a hollow casting in which said rods are mounted, said casting being provided with apertures in its end wall through which the ends of said rods project, springs applied between shoulders on said rods and opposing surfaces in said casting, a stop-plate attached to the outer face of said end wall, and arranged to enter notches in the several rods, and plates or shims inserted between said stop-plate and said end wall to adjust the position of said stop-plate.

18. A molding-machine comprising a mold-plate provided with a mold-recess, a reciprocating plunger adapted to enter the mold-recess, a piston for closing the outer end of the mold-recess, a rod supporting the piston, a backing spring or springs applied to said rod, a crank-shaft for giving motion to said plunger, and a machine-frame embracing two longitudinal side plates in which said crank-shaft is mounted, and a hollow casting in which said rod and backing spring or springs are mounted, said casting being inserted between and rigidly attached to said side plates.

19. A molding-machine comprising a mold-plate, a reciprocating plunger, a piston, a rod carrying the piston, a backing spring or springs for said rod, a crank-shaft and a machine-frame embracing two longitudinal side plates in which said crank-shaft is mounted, and a hollow casting in which said rod and its backing spring or springs are mounted, said casting being interposed between the side plates and connected with the same by connecting pins or trunnions engaging apertures in its side wall and in the frame-plates and by clamping-bolts.

20. A molding apparatus comprising a reciprocating mold-box provided with a mold-recess, a reciprocating plunger adapted to pass through the mold-box and to enter the mold-recess, a piston for closing the outer end of the mold-recess, and means for giving reciprocatory motion to said mold-box and to the said plunger constructed to advance the plunger into the mold-recess and to retract the plunger from the mold-recess while the mold-box is stationary, to thereafter simultaneously retract both the plunger and the mold-box, and in the retractive movement, retracting the mold-box more rapidly than the plunger, thereby moving the mold-box with respect to the plunger to eject the contents of the mold-recess, and then continuing the retractive movement of the plunger until the latter is withdrawn from the mold-recess into the cavity of the mold-box.

21. A molding-machine comprising a reciprocating mold-plate provided with a mold-recess, a reciprocating plunger adapted to enter the said mold-recess, a piston for closing the outer end of said mold-recess, a backing spring or springs for the piston, and means for giving reciprocatory motion to the said mold-plate and to the said plunger, constructed to advance the plunger into the mold-recess while the mold-plate is stationary, to compress the material therein, to then retract the mold-plate and plunger at the same rate of speed to relieve the endwise pressure of the piston against the block or briquet within the mold-recess, and to thereafter further retract both the mold-box and plunger while moving said mold-plate relatively to the plunger to eject the finished block or briquet from the said mold-recess.

22. A molding-machine comprising a reciprocating mold-plate, provided with a mold-recess, a reciprocating plunger constructed to enter the said mold-recess, a piston for closing the outer end of the mold-recess, means for giving reciprocatory motion to the said plunger and the said mold-plate, and stationary stops upon the machine-frame located in position for contact with the mold-plate at the forward limit of its movement and to thereby relieve the actuating devices of the mold-plate from stress during the act of compressing the material within the mold-recess.

23. A molding-machine comprising a machine-frame, a reciprocatory mold-box provided with a mold-recess, a reciprocating plunger adapted to pass through the mold-box and enter said mold-recess, and a feed-box mounted on the machine-frame over the mold-box, said mold-box having flat top surfaces sliding in contact with the bottom of the feed-box.

24. The combination with a machine-frame, of a mold-box, a reciprocating plunger, a rotatative crank-shaft connected with and actuating said plunger, and a feed-box mounted on the machine-frame over and having sliding engagement with the top of said mold-box, said machine-frame being provided with a closed housing which surrounds the said crank-shaft and actuating devices, and which affords bearings for said mold-box at its bottom and side faces and serves with the feed-box to prevent access of dust or dirt to the parts within said housing.

25. A molding-machine comprising two vertical side frame-plates, a bottom plate connecting the same, a feed-box secured to said frame-plate, a mold-box which fits and slides between the side frame-plates, the bottom plate and the bottom of the feed-box, a crank-shaft mounted in the said frame-plates, a plunger, operative connections between said crank-shaft and the said plunger, a rock-shaft mounted in said frame-plates, operative connections between said rock-shaft and the feed-box, a wall forming an extension of the said bottom plate which extends upwardly outside of the said crank-shaft, and a top plate secured to the side frame-plates, and to the upper end of said wall and to the feed-box and forming with said bottom plate, wall, side plates and feed-box, an inclosure for the operative parts by which the plungers and feed-box are operated.

26. The combination of a machine-frame, a mold-plate provided with a mold-recess, an inclosure confining the material to be molded adjacent to the said mold-plate, a reciprocating plunger adapted to enter said mold-recess, a cross-head sliding on the machine-frame, to which said plunger is attached, a crank-shaft, the crank of which is connected by a pitman with said cross-head, a cam carried by the crank-shaft, and a lever having an arm which is engaged with said cam and a second arm which is connected with and gives movement to said mold-plate.

27. The combination with a machine-frame, embracing two side plates and a bottom plate, of a mold-box resting and sliding on said bottom plate, a reciprocating plunger passing through said mold-box, a cross-head also sliding on said bottom plate to which said plunger is secured, a crank-shaft, the crank of which is connected by the pitman with said cross-head, and means actuated by the crank-shaft for giving reciprocatory motion to said mold-box.

28. The combination with a machine-frame embracing two side plates and a bottom plate connected therewith, of a reciprocating mold-box, a reciprocating plunger passing through said mold-box, and a feed-hopper attached to said side plates and extending over the mold-box, said mold-box being provided with flat top bearing-surfaces in contact with the lower surface of the feed-hopper.

29. A molding-machine comprising two parallel vertical side plates, a bottom plate, a feed-box, a reciprocating mold-box which slides on the bottom plate with its end and top surfaces in contact with the side plates and the bottom of the feed-box, a crank-shaft mounted in said side plates, a cross-head sliding on said bottom plate, a pitman connecting said cross-head with the crank-shaft, plungers attached to the cross-head, a hollow casting inserted between and secured to said side plates, yielding pistons, rods for supporting said pistons mounted in said casting, and backing-springs for said rods located within said casting.

30. The combination with a plunger and a cross-head of means for securing the plunger to the cross-head embracing an aperture in the cross-head to receive the end of the plunger, a cap-piece over said aperture adapted to be clamped against the plunger therein, a groove or recess in the cross-head transverse to the said aperture, and one or more plates or shims inserted in said groove between the end of the plunger and the rear wall of the groove.

31. The combination with a machine-frame, of a reciprocating mold-plate provided with a mold-recess, a plunger adapted to enter said mold-recess, a piston for closing the outer end of the mold-recess, and a knock-off device embracing a part mounted on the mold-box and which is movable into and out of line with the mold-recess, and actuating means operated through the movement of the mold-box relatively to the machine-frame, for giving movement to said part.

32. The combination with a machine-frame and reciprocating mold-plate provided with a mold-recess, a reciprocating plunger adapted to enter said mold-recess, and a knock-off device embracing a part mounted movably on the mold-plate, and means for actuating the same embracing a cam on the machine-frame, and a part which engages said cam during the reciprocatory movement of the mold-plate.

33. The combination with a machine-frame, of a reciprocating mold-plate provided with a plurality of mold-recesses, reciprocating plungers adapted to enter said mold-recesses, and a knock-off device comprising a rocking bar mounted on the mold-plate adjacent to said mold-recesses, a cam on the machine-frame, and an arm on the rocking bar engaging said cam on the frame.

34. The combination with a machine-frame, a reciprocating mold-plate provided with mold-recesses, reciprocating plungers, pistons for closing the outer ends of the mold-recesses, and backing-springs for said piston, of rods attached to and moving with the pistons, and scale-plates attached to the frame and acting in conjunction with said rods to show the pressures to which the several pistons are subjected.

35. A molding-machine comprising two side frame-plates, a bottom plate secured thereto, a reciprocating mold-box sliding on said bottom plate in contact at its ends with the side frame-plates, a crank-shaft mounted in said frame-plates, a reciprocating plunger, operative connections between said plunger and said crank-shaft, said bottom plate being depressed at its end beneath the shaft to form an oil-receptacle, and being extended upwardly outside of said shaft.

36. A molding-machine comprising two side frame-plates, a bottom plate secured thereto, a reciprocating mold-box sliding on said bottom plate between the side frame-plates, a crank-shaft mounted in said frame-plates, a reciprocating plunger, operative connections between said crank-shaft and the plunger, said bottom plate being depressed at its end beneath the shaft to form an oil-receptacle, and being extended upwardly outside of said crank-shaft, said bottom plate being inclined downwardly toward the said receptacle.

37. A molding-machine comprising two side frame-plates, a bottom plate attached thereto, a mold-box which slides on said bottom plate between the side plates, a plunger, a cross-head carrying said plunger adapted to slide on said bottom plate, a crank-shaft mounted in said side plates and connected with said cross-head, said bottom plate being depressed beneath the crank-shaft to form an oil-receptacle, and being inclined downwardly toward the oil-receptacle so that the cross-head may enter the lubricant which overflows the lower end of the bottom plate from said receptacle.

38. The combination with a machine-frame embracing two side frame-plates, and a bottom plate, of a reciprocating mold-box sliding on said bottom plate, reciprocating plungers, a cross-head carrying said plungers, also sliding on said bottom plate, and a partition-wall rising from the bottom plate between the cross-head and the mold-box, said bottom plate being provided with a hole or holes located between the said partition-wall and the mold-box.

39. The combination with a machine-frame, a mold-plate, a reciprocating plunger and a cross-head carrying said plunger, a crank-shaft mounted in the frame, a pitman connecting the crank-pin of the crank-shaft with said cross-head, and an oil-receptacle located below the crank-shaft, of means for lubricating the bearings between the pitman and the cross-head, embracing a longitudinal channel in the top surface of said pitman, and holes in the heads of the pitman extending from the ends of said channel to the bearing-surfaces of the crank-pin and cross-head.

40. The combination with the reciprocating plungers of a molding-machine, and a machine-frame provided with an inclosure surrounding the said plungers, of lubricating means consisting of a rotative pipe extending across said inclosure above the plungers, said pipe being provided outside of said inclosure with a valved inlet and within the inclosure with discharge-apertures through which oil within the pipe may be discharged upon the plungers by the turning of the pipe to direct the said discharge-apertures downwardly.

41. The combination with a reciprocating mold-box provided with a flat top surface, of a machine-frame provided with an inclosure for the parts which actuate the mold-box, and which embraces a part which has sliding contact with the flat top surface of the mold-box, and a lubricating-pipe rotatively mounted in said inclosure adjacent to the part thereof which engages the top of the mold-box, said pipe being provided outside of the inclosure with a valved inlet, and within the inclosure with discharge-apertures through which a lubricant may be discharged upon said flat top surface of the mold-box, by turning the pipe to direct the said discharge-apertures downwardly.

In testimony that I claim the foregoing as my invention I affix my signature, in presence of two witnesses, this 16th day of May, A. D. 1901.

BRUCE CLARK WHITE.

Witnesses:
GERTRUDE BRYCE,
WILLIAM L. HALL.